Patented May 25, 1948

2,442,323

UNITED STATES PATENT OFFICE 2,442,323

PROCESS OF MAKING PERCHLORETHYLENE

Clyde W. Davis, Antioch, Philip H. Dirstine, Berkeley, and William E. Brown, Antioch, Calif., assignors to The Dow Chemical Company, Midland, Mich., a corporation of Delaware No Drawing. Application April 10, 1944, Serial No. 530,400

2 Claims. (Cl. 260—654)

This invention relates to a process of making perchlorethylene as a direct chlorination product of methane.

A process of making perchlorethylene is well known in the art, which is based upon the pyrolytic conversion of carbon tetrachloride, according to the equation:

(1) $\quad 2CCl_4 \rightarrow C_2Cl_4 + 2Cl_2$

This reaction is endothermic and proceeds only at a high temperature, generally in the range of 600° to 1500° C., the preferred range, according to Patent No. 1,930,350, being about 800°–900° C.

The starting material for the process, carbon tetrachloride, can be made in various ways, one familiar way being by the chlorination of methane according to the equation:

(2) $\quad CH_4 + 4Cl_2 \rightarrow CCl_4 + 4HCl$

The reaction of chlorine with methane is highly exothermic, and in order to avoid an excessive temperature rise it is usual to conduct the chlorination in stages accompanied by cooling. Otherwise, if the temperature becomes too high, the reaction gets out of control and decomposition occurs with formation of carbon and hydrogen chloride as end products, according to the equation:

(3) $\quad CH_4 + 2Cl_2 \rightarrow C + 4HCl$

The art has resorted to various expedients for controlling the reaction temperature, one of the most common being to dilute the methane with a large volume of inert gas, which serves as an absorbent medium for the heat of reaction. Various gases have been proposed as the diluent, such as $N_2$, CO and HCl, although the most common diluent is methane itself, a sufficiently large excess thereof, in proportion to chlorine, being used to hold the reaction temperature below that at which carbonization occurs. When methane and chlorine are reacted without external cooling to absorb the heat of reaction the volumetric excess of methane over chlorine should be substantially more than 100 per cent in order to prevent carbonization. In such proportions the chlorinated product is largely methyl chloride, $CH_3Cl$. This in turn may be further chlorinated in succeeding stages, using care not to add too much chlorine in any stage so that suitable temperature control may be maintained.

To produce carbon tetrachloride as the final chlorination product of methane is a tedious process, owing to the precautions required to control the reaction temperature. However, we have found that the most serious of the aforementioned disadvantages of the direct chlorination of methane are avoided, if the process is so conducted as to form perchlorethylene, instead of carbon tetrachloride, as the major end product. Inasmuch as the commercial demand for perchlorethylene in the industries is rapidly increasing, while that for carbon tetrachloride at present is relatively static, a more direct and economical process for making perchlorethylene is to be desired than those that have been heretofore used on a commercial scale.

Our invention has various objects, among which are the following: (1) to provide a process of making perchlorethylene by the direct chlorination of methane or a methane-rich gas, such as natural gas; (2) to carry out the chlorination reaction in a single stage; (3) to produce a high yield of perchlorethylene as compared with other chlorination products; (4) to cause the reaction to be thermally self-sustaining without necessity for external heating or cooling; (5) to reduce the number of process steps from the basic raw materials to finished product, as compared with processes hitherto employed. Other objects and advantages will become evident as the description proceeds.

In our approach to the problem of the direct thermal chlorination of methane we conceived that the use of a readily condensable vapor, instead of a gas, as a diluent for the mixture of methane and chlorine would be of advantage, because the higher specific heats of such vapors give them a higher heat absorbing capacity than that of a gas, requiring a smaller volume of vapor for an equal temperature controlling effect and simplifying product recovery. It appeared that carbon tetrachloride, being the end chlorination product of methane, would be a desirable diluent, since it would not undergo further chlorination and would be inert to the action of chlorine. Upon investigation it was found that only about 1.5 to 2.5 volumes of $CCl_4$ vapor were sufficient to control the heat of reaction of one volume of methane with from 2 to 4 volumes of chlorine so as to prevent explosion and carbonization of the mixed gases, without necessity for any external cooling or for gradual or stepwise addition of the chlorine. Thus it was indicated that methane could be completely chlorinated at one step without other temperature control than that provided by the admixture of diluent vapors of carbon tetrachloride itself.

Analysis of the product obtained when carrying out the reaction under the above conditions, however, revealed a high percentage of perchlorethylene. After allowing for the carbon tetrachloride initially added as diluent, it was found that the principal chlorination product so obtained was perchlorethylene. In fact, under some conditions a yield of perchlorethylene in excess of 100 per cent, on the basis of methane, was obtained, which evidently was derived from the conversion to perchlorethylene of a portion of the carbon tetrachloride diluent.

The effectiveness of the above procedure for the thermal chlorination of methane, then, depends not only on the absorption of sensible heat by the diluent vapors, but also on the heat absorption of the endothermic reaction whereby perchlorethylene is formed from carbon tetrachloride. In theory the reactions 1 and 2, supra, proceed simultaneously, the exothermic heat of reaction 2 being balanced to maintain the proper temperature in the reaction zone by the endothermic heat of reaction 1 plus the heat absorption of the added carbon tetrachloride employed as the diluent. A summation of Equations 1 and 2 gives the equation:

(4) $\quad 2CH_4 + 6Cl_2 \rightarrow C_2Cl_4 + 8HCl$

Theoretically, while 4 mols of chlorine are required per mol of methane to form carbon tetrachloride, the ratio is only 3/1 when perchlorethylene is the end product. A secondary reaction occurring in the process causes the formation of a small amount of hexachlorethane by addition of chlorine to the perchlorethylene. Lower temperatures within the operable range are favorable to hexachlorethane formation, but at most it occurs to only a minor degree.

In carrying out our process separate streams of methane and chlorine are mixed in desired proportion, and to the mixed gas stream vapors of carbon tetrachloride are added in amount sufficient to prevent carbonization of the reacting mixture. The mixture of gas and vapor is led into a reaction chamber, wherein the reaction is initiated by usual means, such as an electrical heater or the equivalent. The reaction temperature may thereafter be maintained by the heat of reaction without need for further heating. The chamber walls preferably are heavily insulated to avoid heat loss by radiation as far as possible, and gas inlet and outlet pipes are provided. The reaction is substantially instantaneous and produces a definite front in the flowing gas stream. The rate of flow of the entering gas stream is regulated to correspond to the size of the chlorinator so as to maintain the reaction front within the chlorination chamber. Due to the speed of the reaction a chlorinator of small dimensions operating in continuous flow has the capacity for producing a large daily output. The reacted mixture passes immediately from the chlorinator and is conducted to a condensation and separation system for recovery of products, wherein the liquid products are condensed and distilled to separate perchlorethylene. The carbon tetrachloride recovered on distillation may be returned to the process.

The relative proportions of methane, chlorine and carbon tetrachloride can be varied considerably to produce conditions favorable to a substantial yield of perchlorethylene. It is convenient to express the proportions of chlorine and carbon tetrachloride in the reaction mixture on a numerical basis as mols or volumes per unit mol or volume of methane. Assuming a sufficient proportion of carbon tetrachloride in the mixture to prevent carbonization, the proportion of chlorine, i. e. the $Cl_2/CH_4$ ratio, may vary from about 2 to about 6. Best yields are obtained with a $Cl_2/CH_4$ ratio of 2.5 to 4, the theoretical ratio being 3, as shown by Equation 4. An excess of chlorine above the theoretical proportion apparently acts as a diluent in similar manner to the carbon tetrachloride. The effect of varying the $Cl_2/CH_4$ ratio, with a constant $CCl_4/CH_4$ ratio, is shown in Table I, in which the proportions of the feed components and of the yield of perchlorethylene are expressed in mols.

*Table I*

| No. | Feed | | | Yield | |
|---|---|---|---|---|---|
| | $CH_4$ | $CCl_4$ | $Cl_2$ | $C_2Cl_4$ | Per Cent Theory |
| 1 | 100 | 300 | 204 | 9.5 | 29.0 |
| 2 | 100 | 300 | 273 | 35.4 | 78.0 |
| 3 | 100 | 300 | 364 | 56.0 | 112.0 |
| 4 | 100 | 300 | 500 | 30.0 | 60.0 |
| 5 | 100 | 300 | 600 | 15.0 | 30.0 |
| 6 | 100 | 300 | 800 | 0.0 | 0.0 |

The theoretical yield of perchlorethylene is 50 mols per 100 mols of methane and 300 mols of chlorine. The actual yield for the tabulated examples rises to a maximum at a $Cl_2/CH_4$ ratio of 3.64, and thereafter diminishes progressively as the proportion of chlorine is further increased. It will be observed that the maximum yield shown in the table is more than theoretical, which is accounted for by the conversion of a portion of the carbon tetrachloride used as diluent.

The proportion of carbon tetrachloride to be added to the reaction mixture is primarily determined by the relative volume required to prevent carbonization of the methane. The highest yield of perchlorethylene at any particular $Cl_2/CH_4$ ratio is indicated when the lowest proportion of the diluent is used which is sufficient for the purpose. The chief function of the diluent is to absorb enough of the heat of reaction to prevent an excessive rise of temperature, but if too large a proportion of the diluent is used the temperature of the mixture will be held so low that the formation of perchlorethylene is suppressed. There is a considerable range within which the proportion of carbon tetrachloride can be varied, this range depending somewhat upon the proportion of chlorine in the reaction mixture. When the molar ratio $Cl_2/CH_4$ is 2, the practical working range for the ratio $CCl_4/CH_4$ is about 1.5 to 4. At a $Cl_2/CH_4$ ratio of 3, the ratio $CCl_4/CH_4$ is from 2 to 5. For $Cl_2/CH_4$ ratios above 3, where the excess over the theoretical chlorine proportion also exerts a diluting effect, the lower and upper limits of the range of the $CCl_4/CH_4$ ratio are gradually lowered as the proportion of chlorine increases, approximately as shown in Table II.

*Table II*

| Mol Ratio $Cl_2/CH_4$ | Mol Ratio $CCl_4/CH_4$ | |
|---|---|---|
| | Minimum | Maximum |
| 2 | 1.5 | 4.0 |
| 3 | 2.0 | 5.0 |
| 4 | 1.5 | 4.5 |
| 5 | 1.0 | 4.0 |
| 6 | .5 | 3.5 |

The tabulated values apply when the process is conducted so as to be thermally self-sustaining without substantial loss of heat by radiation. If the process were carried out in such way that heat loss by radiation was considerable, the above values for the ratio $CCl_4/CH_4$ wold be lowered, whereas, if external heat were added, the values might be increased. In general, the values shown by the table set out the range within which a good yield of perchlorethylene can be obtained and carbonization of the reacting gases can be avoided.

The effect upon the yield of perchlorethylene by varying the proportion of diluent is shown in Table III. In the table columns 1, 2 and 3 show the mol proportions of $CH_4$, $Cl_2$ and $CCl_4$, respectively, the first three examples having a mol ratio $Cl_2/CH_4$ of 2.73, and in the last six examples a ratio of 3.64. Columns 4 and 5 show the calculated mol percentages of $CCl_4$ and $C_2Cl_4$ in the liquid reaction product, assuming theoretical conversion of $CH_4$ to $C_2Cl_4$ by reaction with $Cl_2$ in the stoichiometric proportions of 1 mol $CH_4$ to 3 mols $Cl_2$. Columns 6, 7, 8 and 9 show the actual mol percentages of $CCl_4$, $C_2Cl_4$, $C_2Cl_6$ and $CHCl_3$ found in the liquid reaction product, the presence of a small amount of $C_2Cl_6$ as by-product being due to chlorination of a portion of the $C_2Cl_4$, as already explained, while $CHCl_3$ is the result of incomplete chlorination of methane. Column 10 shows the percentage of theoretical yield of $C_2Cl_4$ actually recovered in the product, while column 11 shows the total percentage conversion of $CH_4$ to chlorinated $C_2$ compounds $(C_2Cl_4+C_2Cl_6)$.

a function of the concentration of diluent vapor of carbon tetrachloride, and will vary inversely as the concentration of diluent in the absence of extraneous factors modifying the thermal balance of the reaction. There is a minimum concentration of the diluent which is required to absorb sufficient heat to hold the temperature just below the carbonization point of methane. As the concentration of diluent is increased above the minimum the reaction temperature is correspondingly reduced, and as the temperature is reduced the yield of perchlorethylene falls accordingly. A secondary effect of the lowered temperature is an increase in ratio of hexachlorethane to perchlorethylene in the liquid product, as shown in Table III. The maximum yield of perchlorethylene, therefore, is attained by operating close to the minimum concentration of carbon tetrachloride as diluent, although maintenance of a reasonable margin of safety is an important practical consideration.

The highest yields of perchlorethylene are obtained with a $Cl_2/CH_4$ ratio between 2.5 and 4, and a $CCl_4/CH_4$ ratio between 2 and 4. We prefer to operate the process without the application of external heating or cooling, the reaction temperature being maintained solely by the thermal balance of the reactions occurring in the presence of the diluent vapors of carbon tetrachloride. Operating in this way within the above ranges of proportions the observed temperature within the reaction zone is generally on the order of 500° to 600° C.

*Table III*

| | Mols Feed | | | Mol Per Cent in Product at 100% Conversion | | Actual Product, Mol Per Cent | | | | Per Cent Yield | |
|---|---|---|---|---|---|---|---|---|---|---|---|
| | (1) $CH_4$ | (2) $Cl_2$ | (3) $CCl_4$ | (4) $CCl_4$ | (5) $C_2Cl_4$ | (6) $CCl_4$ | (7) $C_2Cl_4$ | (8) $C_2Cl_6$ | (9) $CHCl_3$ | (10) $C_2Cl_4$ | (11) Total $C_2Cl_x$ |
| 1 | 100 | 273 | 165 | 78.4 | 21.6 | 67.0 | 28.2 | 3.6 | 1.2 | 130.5 | 147.2 |
| 2 | 100 | 273 | 300 | 86.8 | 13.2 | 82.9 | 10.3 | 2.6 | 4.2 | 78.0 | 97.7 |
| 3 | 100 | 273 | 385 | 89.5 | 10.5 | 88.5 | 5.6 | 2.3 | 3.6 | 53.3 | 75.2 |
| 4 | 100 | 364 | 230 | 82.2 | 17.8 | 72.0 | 26.2 | 1.8 | | 147.2 | 157.3 |
| 5 | 100 | 364 | 256 | 83.7 | 16.3 | 78.2 | 20.6 | 1.2 | | 126.4 | 133.7 |
| 6 | 100 | 364 | 290 | 85.3 | 14.7 | 81.8 | 17.0 | 1.2 | | 115.6 | 123.8 |
| 7 | 100 | 364 | 392 | 88.7 | 11.3 | 89.6 | 8.0 | 2.4 | | 70.8 | 92.0 |
| 8 | 100 | 364 | 473 | 90.5 | 9.5 | 91.7 | 2.0 | 1.1 | 5.2 | 21.1 | 34.8 |
| 9 | 100 | 364 | 776 | 93.9 | 6.1 | 96.0 | 0.0 | 0.9 | 3.1 | 0.0 | 14.7 |

In the above examples a yield in excess of 100 per cent of theory indicates the conversion of a portion of the added carbon tetrachloride to perchlorethylene. Where the yield is less than 100 per cent of theory, either one or both of two conditions exist in the reaction mixture, namely, that some carbon tetrachloride is formed by chlorination of methane without being converted to perchlorethylene, or that a portion of the methane passes through the reaction without being chlorinated or is only incompletely chlorinated. When there is a deficiency of chlorine with respect to the theoretical $Cl_2/CH_4$ ratio of 3/1, as in Examples 1–3, methane or its partially chlorinated derivatives, e. g. chloroform, are found in the reaction product. On the other hand, with an excess of chlorine over the 3/1 ratio, chlorine is present in the exit gases.

The inversely varying yield of perchlorethylene with increasing proportion of carbon tetrachloride in the reacting mixture is accounted for by the progressively increasing effect of the diluent in depressing the reaction temperature. The actual temperature within the reaction zone is The foregoing mode of operation can be modified, if desired, to apply some degree of external control of the reaction temperature independently of the proportion of diluent in the reacting mixture. Thus the chlorinator may be provided with external heating or cooling means, and the process so conducted as to maintain the desired reaction temperature by addition or subtraction of heat, as the case may be, to some extent independently of the proportion of diluent in the reacting mixture, although such mode of operation would not safely permit reducing the proportion of diluent much below the minimum limits already stated. For example, a fused salt bath, heated to a suitable temperature, may be used as a temperature control medium for the process, and the reaction gases bubbled through the same in the manner known to the art for other chlorination reactions.

The temperature of the reaction zone in our process, which, as stated above, is generally in the range of 500° to 600° C., is significantly lower than the temperatures required for pyrolyzing carbon tetrachloride to form perchlorethylene, when carried out separately, which are on the order of about 800° C. or higher. We have found that, for a contact time comparable to that existing in our process, the pyrolysis of carbon tetrachloride at 530°–630° C. gives a yield of perchlorethylene of only about 1.0 per cent of theory, and at 810°–860° C. a yield of only 38.0 per cent of theory. Under the conditions of our process for thermal chlorination of methane, in which carbon tetrachloride is presumed to be formed as an intermediate product, we not only can obtain the theoretical yield of perchlorethylene within a temperature range of 500°–600° C., but also a substantial degree of pyrolysis of the carbon tetrachloride added as diluent.

The examples in Table IV show actual reaction zone temperatures as obtained by thermally self-sustained operation under representative conditions within the preferred range of the invention.

Table IV

| | Mols Feed | | | Product, Mol Per Cent | | | Per Cent Yield | | Temp., °C. |
|---|---|---|---|---|---|---|---|---|---|
| | $CH_4$ | $Cl_2$ | $CCl_4$ | $CCl_4$ | $C_2Cl_4$ | $C_2Cl_6$ | $C_2Cl_4$ | $C_2Cl_6$ | |
| 1 | 100 | 307 | 356 | 82.3 | 15.0 | 2.7 | 122.0 | 144.0 | 536 |
| 2 | 100 | 340 | 277 | 78.0 | 20.6 | 1.4 | 135.0 | 144.0 | 539 |
| 3 | 100 | 340 | 350 | 85.6 | 13.7 | 0.7 | 110.0 | 115.0 | 537 |

The invention can be practiced not alone for the thermal chlorination of methane itself, but also with the use of a methane-rich gas, such as natural gas. The presence of small amounts of inert gases in the natural gas will not materially affect the yields of perchlorethylene, while ethane in the gas will be chlorinated largely to perchlorethylene also.

We claim:

1. A process of making perchlorethylene which comprises forming a gaseous mixture of methane, chlorine and carbon tetrachloride, in which the molar ratio $Cl_2/CH_4$ is from 2 to 6 and the molar ratio $CCl_4/CH_4$ is a value between 0.5 and 5 at which the carbon tetrachloride vapors by dilution and heat absorption maintain the temperature of the ensuing reaction above 500° C. but prevent it from rising to the point where decomposition of methane occurs, passing the gaseous mixture in the absence of a chlorination catalyst into an insulated zone in which reaction occurs, the temperature being maintained within the aforesaid range by the heat of reaction, and separating perchlorethylene from the reaction products.

2. Process according to claim 1, in which the ratio $Cl_2/CH_4$ is between 2.5 and 4 and the ratio $CCl_4/CH_4$ is a value between 2 and 4 sufficient to maintain the reaction temperature between 500° and 600° C.

CLYDE W. DAVIS.
PHILIP H. DIRSTINE.
WILLIAM E. BROWN.

REFERENCES CITED

The following references are of record in the file of this patent:

UNITED STATES PATENTS

| Number | Name | Date |
|---|---|---|
| 1,930,350 | Strosacker | Oct. 10, 1933 |
| 2,200,254 | Bender | May 14, 1940 |
| 2,200,255 | Bender | May 14, 1940 |
| 2,252,536 | Wiley | Aug. 12, 1941 |
| 2,305,821 | Wimmer | Dec. 22, 1942 |

FOREIGN PATENTS

| Number | Country | Date |
|---|---|---|
| 58,273 | Austria | Mar. 26, 1913 |

OTHER REFERENCES

Ellis, "Chemistry of Petroleum Derivatives," vol. 1, page 706 (1934).

Beilstein, "Handbuch der Organischen Chemie," vol. 1, page 65 (1918).